UNITED STATES PATENT OFFICE.

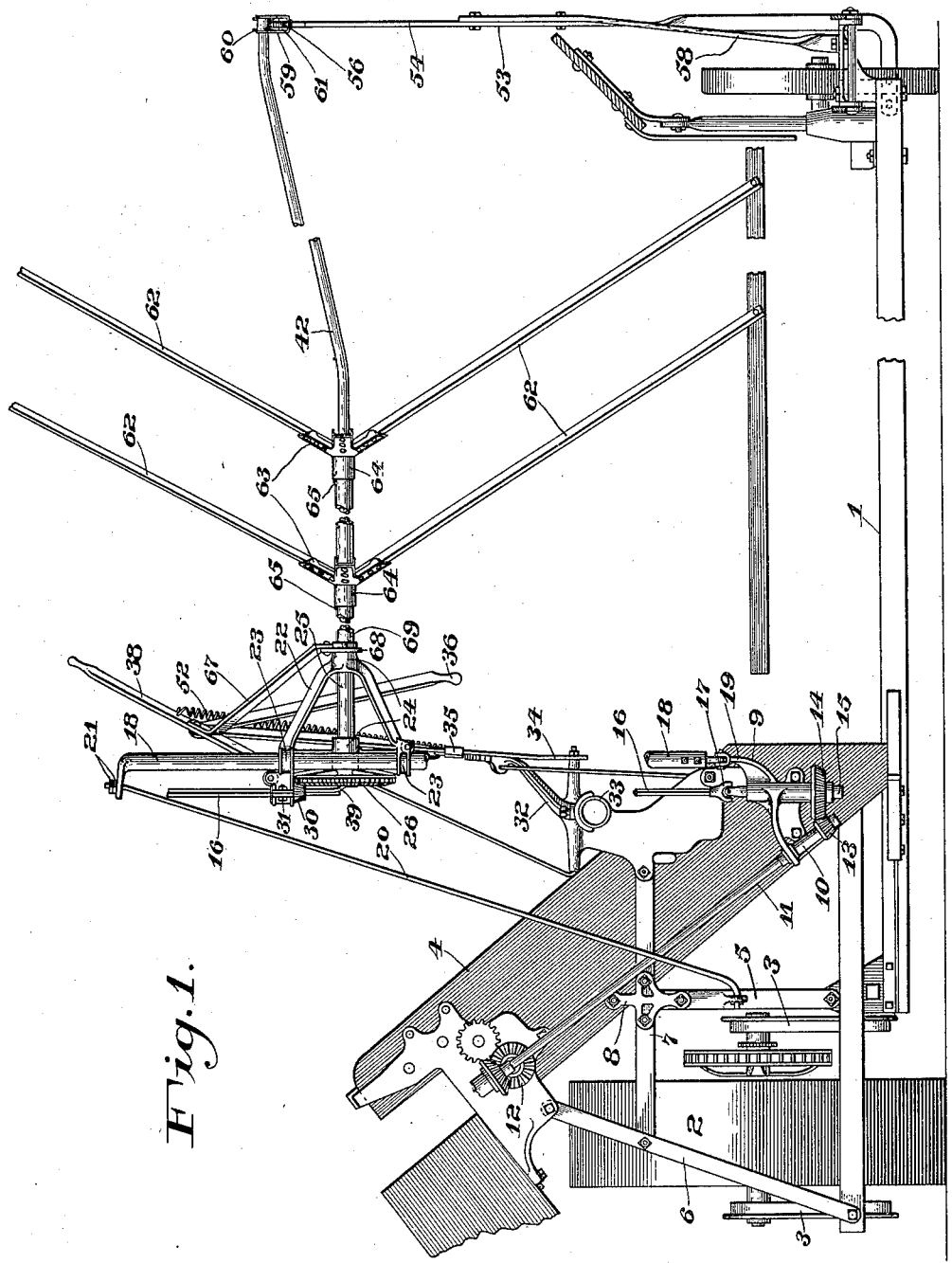

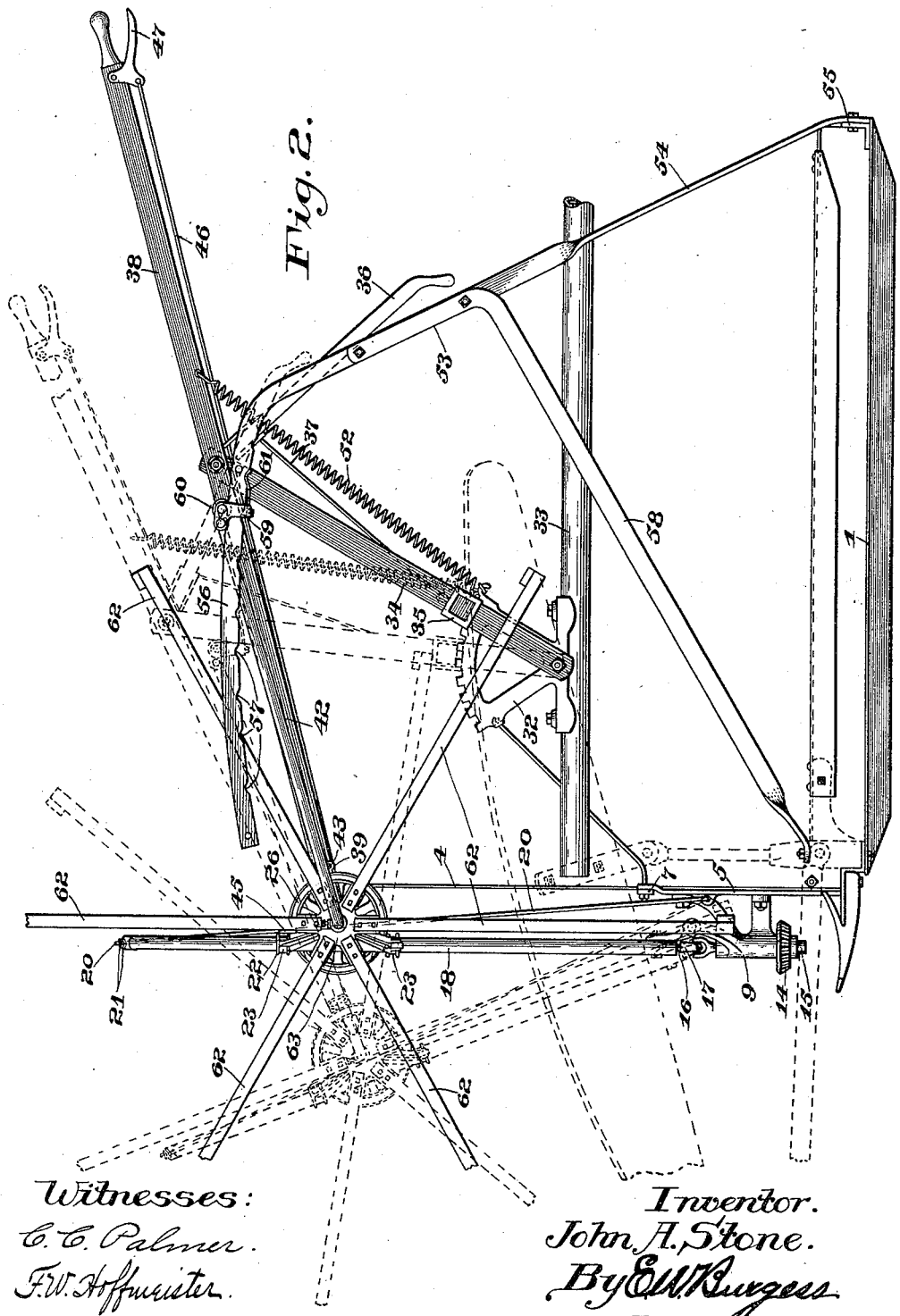

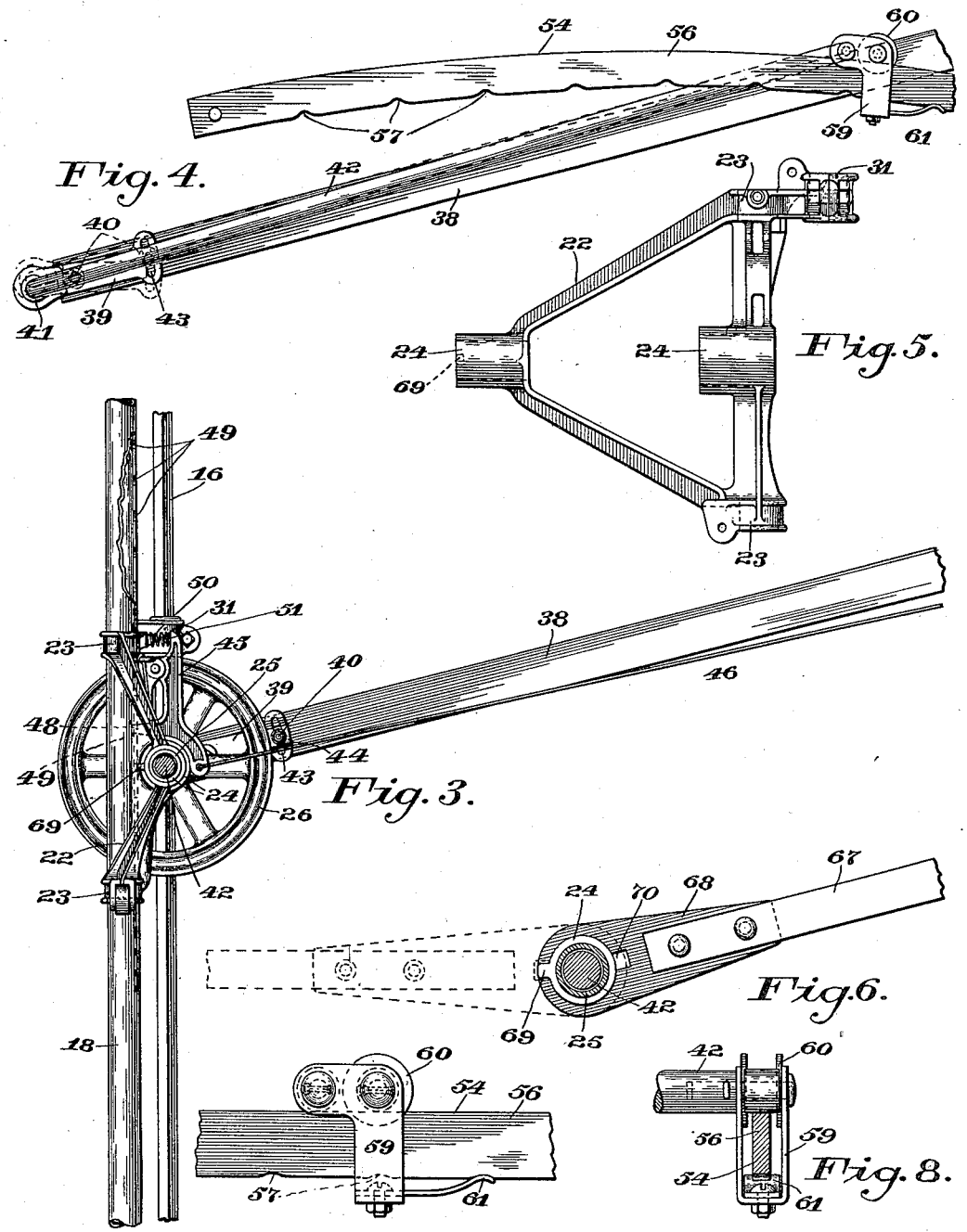

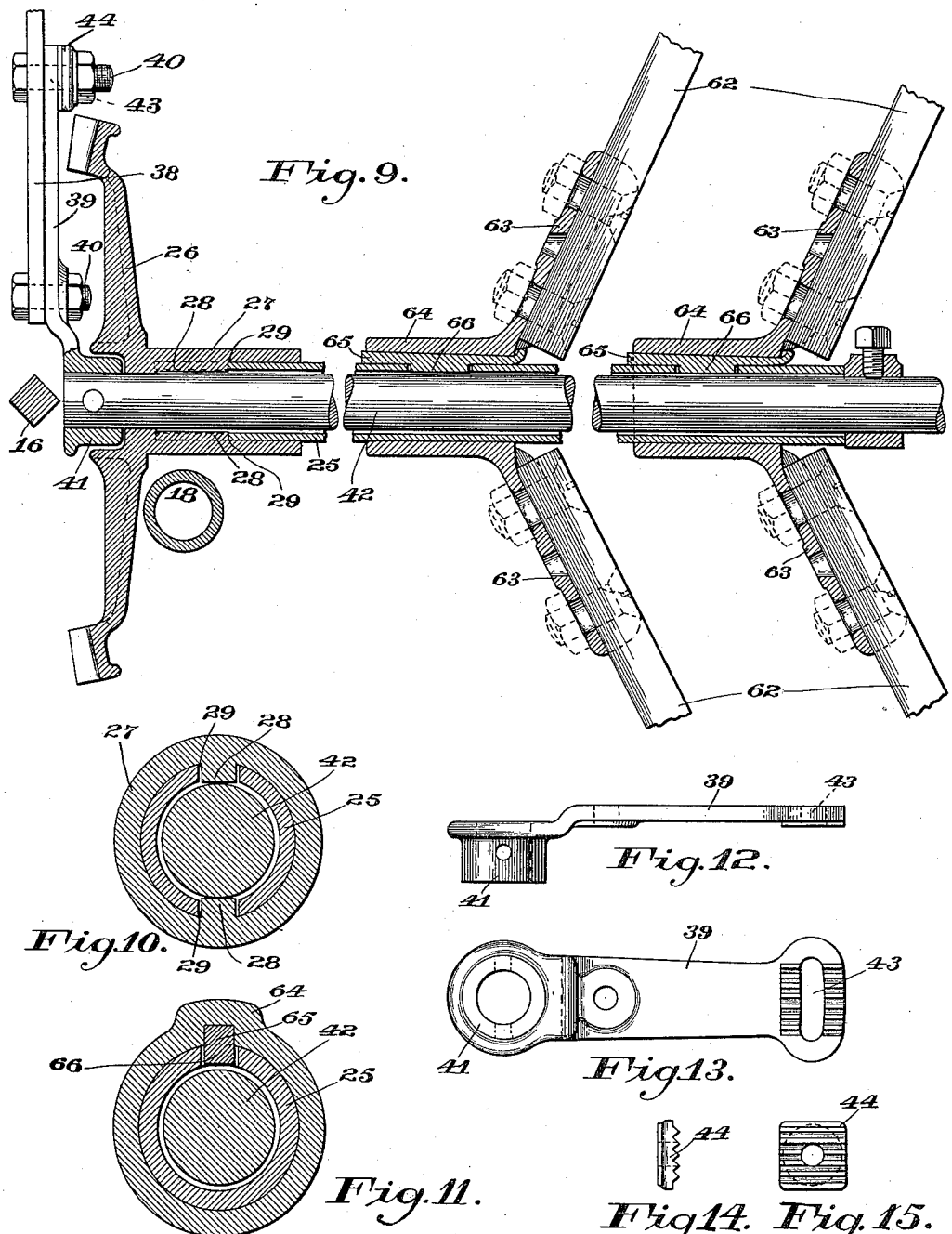

JOHN A. STONE, OF CHICAGO, ILLINOIS, ASSIGNOR TO INTERNATIONAL HARVESTER COMPANY, A CORPORATION OF NEW JERSEY.

HARVESTER-REEL SUPPORT.

1,004,930.　　　　　Specification of Letters Patent.　　Patented Oct. 3, 1911.

Application filed May 29, 1911. Serial No. 630,138.

*To all whom it may concern:*

Be it known that I, JOHN A. STONE, a citizen of the United States, residing at Chicago, in the county of Cook and State of Illinois, have invented certain new and useful Improvements in Harvester-Reel Supports, of which the following is a specification.

My invention relates to grain harvesters, and in particular to means whereby the reel is supported at each end thereof in a manner to sustain it in a position substantially parallel with that of the cutting apparatus, for the purpose of preventing the grainward end thereof from sagging and contacting with the cutting apparatus when the reel is lowered to a position in close proximity thereto, and it consists in a supplemental support arranged at the grainward end of the grain platform with which the reel mechanism is connected in a manner that permits the reel to be adjusted to its various operative positions, and at the same time affords a substantially rigid support against any sagging movement of the grainward end thereof; the object of my invention being to provide a reel support that is comparatively rigid against accidental displacements in its various positions of adjustment and having great flexibility to permit it to be readily manipulated by the operator to meet the requirements of varied crop conditions. I attain these objects by means of the mechanism illustrated in the accompanying drawings, in which—

Figure 1 represents a front elevation of part of a grain harvester, including a grain platform and elevator, and having my improved reel supporting mechanism forming a part thereof; Fig. 2 is an end elevation of part of Fig. 1 viewed from the grainward end of the grain platform; Fig. 3 is a detached detail of the reel adjusting mechanism, representing the hand lever mechanism as connected with the stubbleward end of the reel; Fig. 4 is a detached detail of the supporting means at the grainward end of the platform and also part of the controlling mechanism at the stubbleward end thereof; Fig. 5 represents a detached detail of the reel adjusting and supporting means, designed to illustrate the form of a sliding bracket carrying bearings in which the reel shaft may be journaled; Fig. 6 represents a detached detail of part of the hand lever mechanism at the stubbleward end of the reel; Fig. 7 is a detail of a sliding bracket and its supporting member forming part of the reel mechanism at the grainward end of the platform; Fig. 8 is an end elevation of Fig. 7; Fig. 9 is a detail representing a longitudinal section of part of the reel supporting shaft and some of the associated parts forming part of Fig. 1; Fig. 10 is a cross section of the hub of a reel driving gear wheel showing the manner of connecting it with the reel shaft; Fig. 11 is a cross section through the hub of a reel spider and designed to illustrate the manner of connecting it with the reel shaft; Fig. 12 is a top plan view of part of the hand lever mechanism; Fig. 13 is a side elevation of Fig. 12; Fig. 14 is a detail of the hand lever mechanism, designed to illustrate the construction of a locking washer which forms a part of the reel controlling mechanism; and Fig. 15 represents a side elevation of Fig. 14.

The same reference characters designate like parts throughout the several views.

1 represents the grain platform of a harvester, 2 the traction wheel, 3 a part of the wheel frame, 4 the front inclined member of the elevator frames supported by the grain platform and by means of a vertically arranged bar 5 and an inclined elevator supporting bar 6, and 7 represents a horizontally arranged bar having its stubbleward end secured to the inclined bar 6, its opposite end to member 4 of the elevator, and its middle portion attached to the upper end of the vertical bar 5 by means of a bracket 8 that has its upper end secured to the elevator.

9 represents a bracket secured to the lower end of the elevator frame member 4 and provided with a stubblewardly and upwardly inclined bearing box 10, in which is journaled the lower end of reel driving shaft 11, the upper end of said shaft being operatively connected with a power transmitting member 12 at the upper end of the elevator and forming part of the harvester mechanism and having secured to its lower end a pinion 13 that engages with a gear wheel 14 secured to the lower end of a vertically arranged shaft 15 journaled in a bearing carried by the bracket, the upper end of said shaft being connected with the lower end of an angular reel driving shaft 16 by means of a universal coupling member 17.

18 represents a reel supporting bar, preferably of tubular form, pivotally connected at its lower end with an arm 19 forming part of the bracket member 9 and adapted to swing at its upper end in a vertical plane in a fore and aft direction and supported against lateral movement by means of a stay rod 20 secured to its upper end, the rod being inclined downward and stubbleward and pivotally connected with the vertical bar 5 of the frame structure in substantially axial alinement with the pivotal connection of bar 18 therewith, the upper end of the stay rod being provided with adjusting nuts 21 whereby the bar 18 may have its angular relation with the grain platform varied in a lateral direction.

22 represents a reel supporting bracket provided with vertically arranged bearing members 23 whereby it is slidably mounted upon the reel supporting bar 18, and horizontally arranged bearings 24 in which is journaled a tubular reel shaft 25.

26 represents a driving gear wheel, the hub of which is provided with a bearing portion 27 at its stubbleward end and longitudinally arranged rib portions 28 upon its interior that are oppositely disposed and received by slots 29 through the walls of the reel shaft.

30 represents a pinion that is journaled in a vertically arranged bearing 31 forming part of the reel supporting bracket and provided with an axial angular opening that slidably receives the reel driving shaft 16.

32 represents a toothed sector secured to the front end of a seat supporting member 33 forming part of the frame of the harvester, and 34 is a swinging fulcrum bar having its lower end pivotally connected with the sector concentric with its toothed portion and provided with a sliding detent 35 that is adapted to engage with the teeth of the sector in a manner to secure the bar in adjustment in a fore and aft direction, and 36 represents a rearwardly extending hand lever pivotally connected with the upper end of the fulcrum bar and having a link 37 connecting it with the sliding detent in a manner whereby the fulcrum bar may be released from engagement with the sector and permit the operator to swing it in a fore and aft direction.

38 represents a hand lever pivotally connected intermediate its ends with the upper end of the fulcrum bar, preferably coaxially with the bar controlling hand lever 36, and having its forward end secured to an arm 39 by means of bolts 40, the arm being provided with a boss portion 41 at its forward end whereby it is secured to the stubbleward end of a reel supporting shaft 42 that is received by the tubular reel shaft 25, the boss portion of the arm being received by the counterbore portion 27 of the hub of gear wheel 26.

43 represents a slotted opening at the rear end of the arm arranged concentric with the securing bolt at its forward end whereby the arm may be adjusted relative to the hand lever, and 44 represents a washer having corrugations upon its surface that engage with corresponding corrugations upon the adjacent face of the arm whereby it coöperates with the securing bolt in a manner to hold the parts rigidly in any position of adjustment.

45 represents a swinging latch having its upper end pivotally connected with the reel supporting bracket 22, and its lower end connected by means of a link 46 with a thumb lever 47 pivotally mounted upon the rear end of the hand lever 38 whereby the latch may be swung about its pivot.

48 represents a forwardly projecting pintle intermediate the ends of the latch that may be received by any one of a series of openings 49 through the rear wall of the reel supporting bar 18 in a manner to sustain the reel supporting bracket in any desired position of adjustment thereon, and 50 represents a compression spring interposed between the bracket and a heel portion 51 upon the latch member and operative to yieldingly hold the pintle portion thereof in engagement with one of the openings in the reel supporting bar.

52 represents a coiled tension spring having one end secured to the sector 32 and the opposite end thereof to the hand lever 38 in rear of its pivot, whereby it operates to counterbalance the weight of the reel mechanism.

53 represents a reel supporting frame at the grainward end of the grain platform including a frame member 54 having its lower end secured to the rear sill 55 of the grain platform and inclining forward and upward is provided at its upper end with a forwardly extending curved portion 56 that is provided with a series of depressions 57 upon its lower edge, and a brace member 58 having its lower forward end secured to the front side of the grain platform, and inclining rearward and upward is secured at its opposite end to frame member 54.

The reel supporting shaft 42 extends through the tubular reel shaft 25 at its stubbleward end and is then turned rearward and stubbleward, and 59 represents a U-shaped trolley member pivotally secured to the end thereof, the trolley member being provided with a flanged wheel 60 at its upper end that rides upon the upper edge of curved portion 56 of the frame member 54, and a curved plate spring 61 having its forward end secured to the lower end of the trolley frame and the rear end thereof adapted to engage with the depressions 57 in the lower edge of the frame member in a manner to yieldingly hold the stubbleward end of the reel supporting shaft 42 against any independent movement thereof along the supporting frame member. The axis of the connection between the trolley member and the shaft is approximately in alinement with the pivotal axis of the hand lever 38 upon the swinging fulcrum bar 34. The reel arms 62 are secured at their inner ends to spiders 63 that are provided with hub portions 64 having keyways formed therein that receive keys 65, the keys being provided with inwardly projecting lip portions 66 that are received by longitudinal openings in the tubular reel supporting shaft, the keys being tapered throughout their length and the keyways in the hubs of the spiders formed in a manner permitting the spiders to be driven over the keys, and then the latter are turned up at their thinner faces, as shown in Fig. 9.

67 represents a brace member having its rear end secured to the hand lever 38 and its forward end to a member 68, the latter member having an opening therein that receives the end of the grainward bearing for the tubular reel shaft, the bearing being provided with a radially projecting boss 69 at its front side, and the member 68 with a notch 70 in the wall of its axial opening that permits said member to pass beyond the boss, when it may be turned rearward in a manner to secure it in position as shown in Fig. 6.

The reel may be adjusted in a higher or lower plane by manipulating the hand lever 38, or in a fore and aft direction by means of hand lever 36. The rearward extending end of shaft 42 operates as a crank and follows an upward or downward movement of the reel by turning upon its pivotal connection with the trolley member, and the trolley wheel rolls along the curved track when the reel is adjusted in a fore and aft direction, the torsional strength of the shaft resisting any downward movement of the grainward end of the reel independent of the stubbleward end thereof, and the grainward end thereof may be adjusted to a higher or lower plane independent of the stubbleward by adjusting the arm 39 secured to the stubbleward end of shaft 42 relative to the lever 38 by means of the slotted opening in the arm, and thereby rock the shaft in the desired direction.

What I claim as being my invention, and desire to secure by Letters Patent, is:

1. A harvester reel supporting mechanism including, in combination, a tubular reel shaft, a supporting bracket for said shaft journaled thereon, and means for supporting said bracket in a manner whereby it may be adjusted to a higher or lower plane or in a fore and aft direction, a reel supporting shaft received by said tubular shaft in a manner permitting said tubular shaft to rotate thereon, an arm secured to the stubbleward end of said reel supporting shaft, the opposite end of said shaft being provided with a rearwardly extending crank portion, a support for said crank portion permitting it to be adjusted in a fore and aft direction, and means whereby said arm may be adjusted relative to said supporting bracket in a manner to rock said reel supporting shaft whereby the grainward end thereof may be adjusted to a higher or lower plane independent of the stubbleward end thereof.

2. A harvester reel supporting mechanism including, in combination, a tubular reel shaft, a reel supporting bracket carrying bearings in which said tubular shaft is journaled, means for supporting said bracket in a manner whereby it may be adjusted to a higher or lower plane or in a fore and aft direction, said means including a hand lever connected with said bracket coaxially with said tubular shaft, a reel supporting shaft received by said tubular shaft in a manner permitting said tubular shaft to rotate thereon, an arm secured to the stubbleward end of said reel supporting shaft adjacent said hand lever, the opposite end of said shaft being turned rearward and grainward beyond the end of said tubular shaft, a support at the grainward end of the reel arranged in a fore and aft direction and upon which said reel supporting shaft is slidably mounted, said arm being secured to said hand lever in an adjustable manner whereby said reel supporting shaft may be rocked in a manner to raise or lower the grainward end of the reel independent of the stubbleward end thereof.

3. A harvester reel supporting mechanism including, in combination, a tubular reel shaft, a reel supporting bracket having bearings in which said tubular shaft is journaled, means for supporting said bracket whereby it may be adjusted to a higher or lower plane or in a fore and aft direction, a reel supporting shaft received by said tubular shaft in a manner permitting said tubular shaft to rotate thereon, the stubbleward end of said reel supporting shaft being secured to said bracket and the grainward end thereof extending through said tubular shaft and turned rearward of the axis thereof, a curved support carried by the harvester frame and adapted to receive the grainward end of said reel supporting shaft in a slidable manner and having a series of depressions upon one side thereof, and a spring mechanism carried by said shaft and adapted to engage with said depressions in a manner to yieldingly resist a sliding movement of said shaft.

4. A harvester reel supporting mechanism including, in combination, a tubular reel shaft, a reel supporting bracket having bearings in which said tubular shaft is journaled, means for supporting said bracket in a manner whereby it may be adjusted to a higher or lower plane or in a fore and aft direction, a reel supporting shaft received by said tubular shaft in a manner permitting said tubular shaft to rotate thereon, the stubbleward end of said reel supporting shaft being secured to said bracket and the grainward end thereof extending through said tubular shaft and turned rearward of the axis thereof, a U-shaped trolley frame pivotally connected with the grainward end of said reel supporting shaft and having a flanged wheel journaled thereon, a curved support carried by the harvester frame and adapted to receive said trolley frame in a manner permitting said wheel to roll upon the upper edge thereof, a series of depressions upon the lower edge of said support, and a plate spring having one end secured to said trolley frame and its opposite end adapted to engage with said depressions in a manner to yieldingly resist a movement of said trolley frame in either direction.

JOHN A. STONE.

Witnesses:
WILLIAM CLARK,
WM. KLOCKZIEN.

---

Copies of this patent may be obtained for five cents each, by addressing the "Commissioner of Patents, Washington, D. C."